INVENTOR
JOHN W. TURNER, JR.
BY C. G. Stallings
ATTORNEY

Feb. 9, 1971 J. W. TURNER, JR 3,561,811
WELL PIPE RACKER
Filed May 23, 1968 8 Sheets-Sheet 4
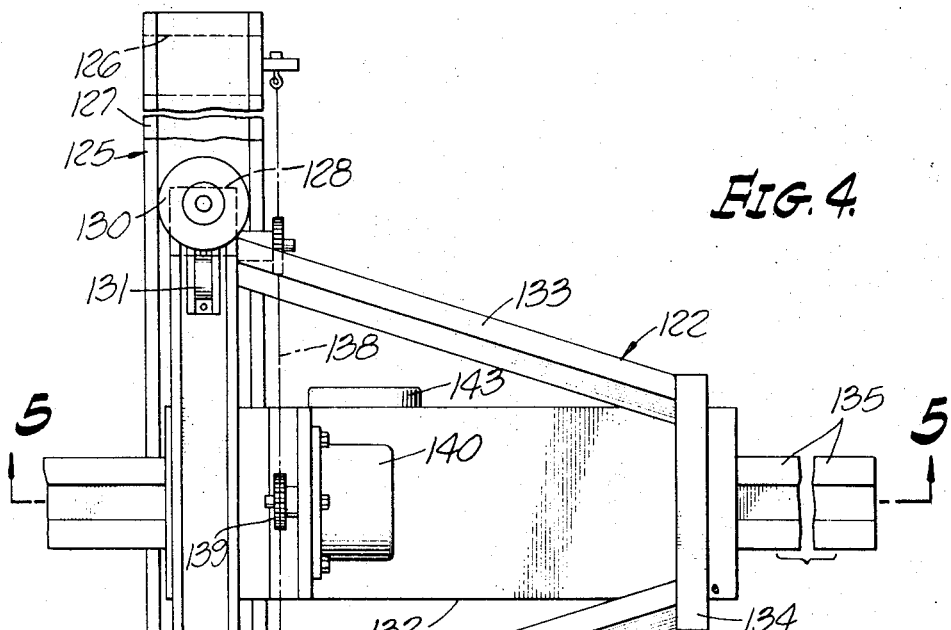
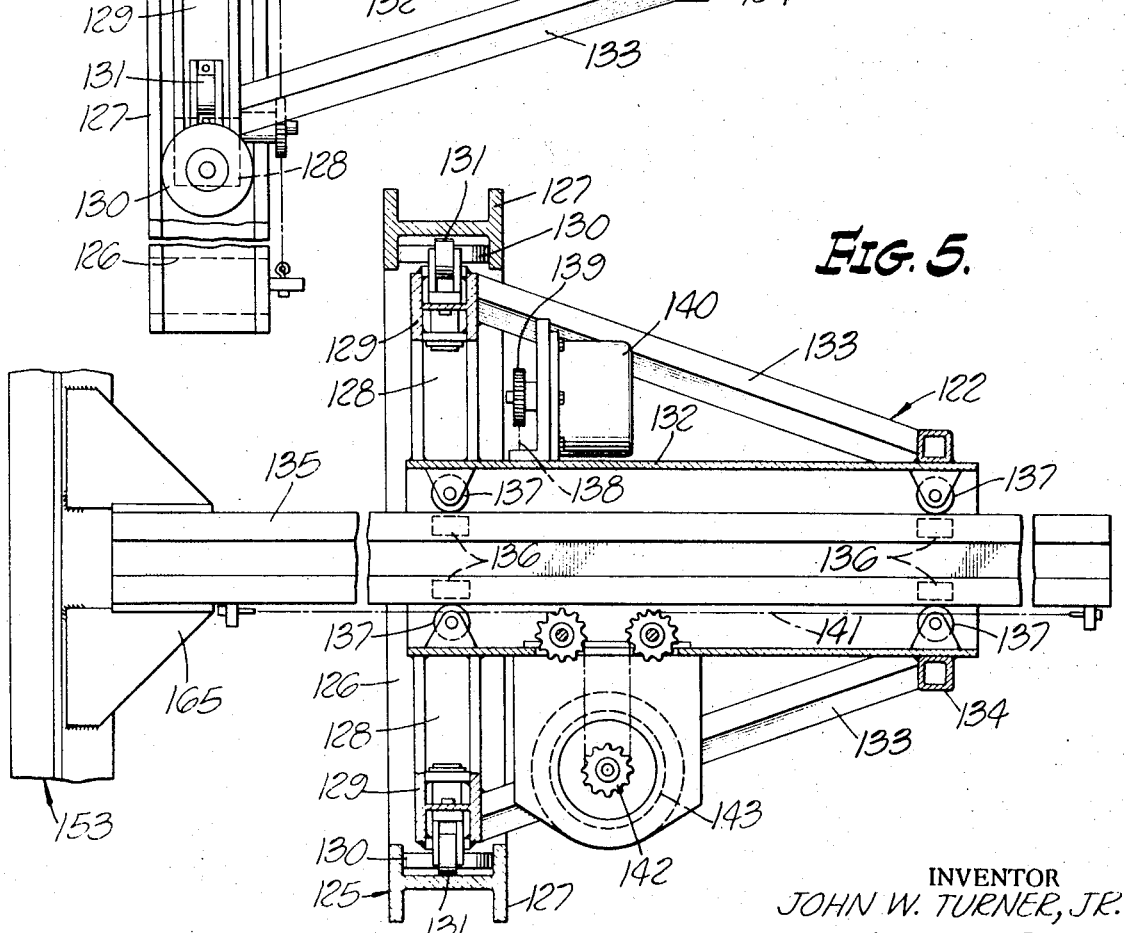
INVENTOR
JOHN W. TURNER, JR.
BY C. G. Stallings
ATTORNEY INVENTOR
JOHN W. TURNER, JR.
BY C. G. Stallings
ATTORNEY

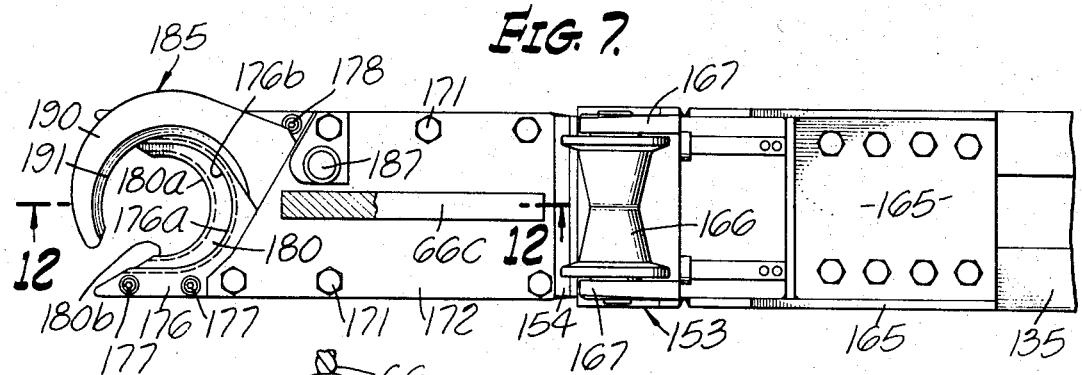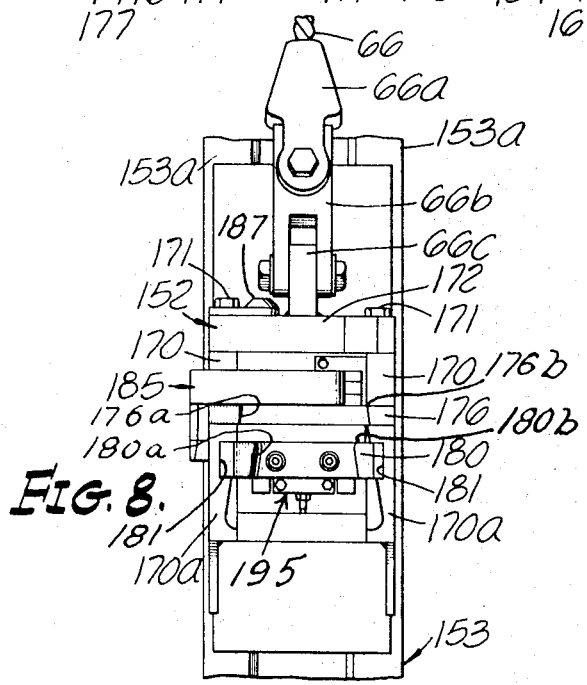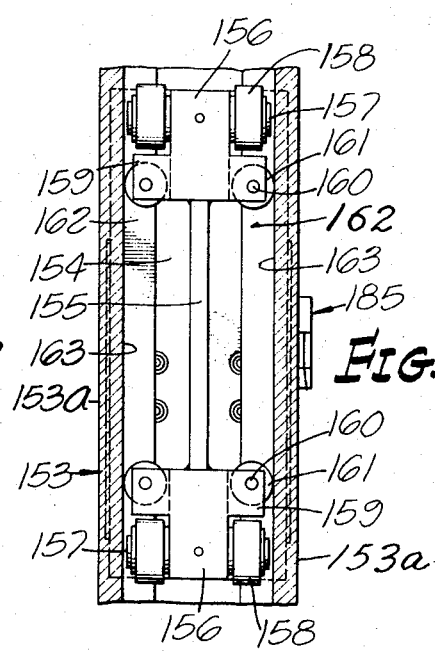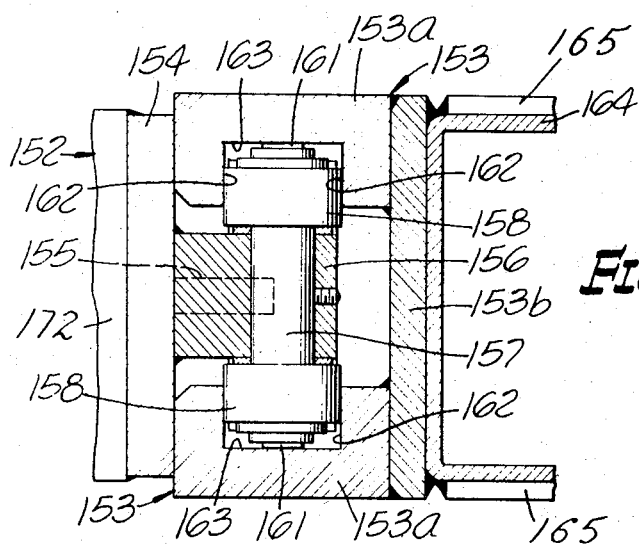

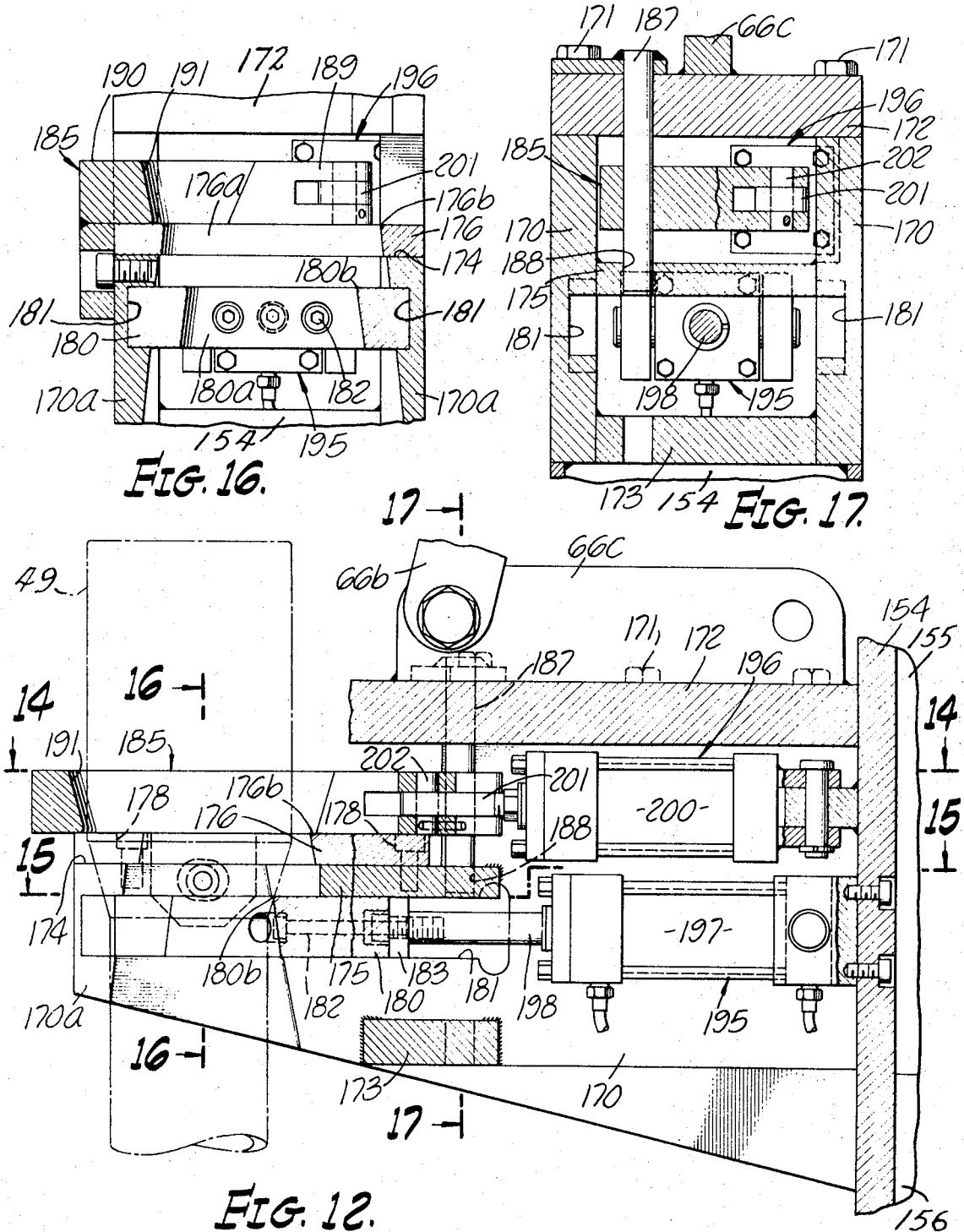

Feb. 9, 1971  J. W. TURNER, JR  3,561,811
WELL PIPE RACKER

Filed May 23, 1968  8 Sheets-Sheet 8

INVENTOR
JOHN W. TURNER, JR.
BY C. G. Stallings
ATTORNEY

United States Patent Office 3,561,811
Patented Feb. 9, 1971

3,561,811
WELL PIPE RACKER
John W. Turner, Jr., Houston, Tex., assignor to Byron Jackson Inc., Long Beach, Calif., a corporation of Delaware
Filed May 23, 1968, Ser. No. 731,542
Int. Cl. E21b *19/00*
U.S. Cl. 294—90                                  7 Claims

ABSTRACT OF THE DISCLOSURE

A well drilling rig having pipe racker apparatus in which a number of racker arms are controllable from a remote location to engage drill pipe tool joints and drill collars, one of the arms having a head for supporting the weight of lengths or stands of pipe or drill collars being added to or removed from the drill string, while the arms are retracted or extended and moved to place such stands in the rack therefor in vertical relation or to remove such stands from the rack therefor and position the stands over the well for connection to the drill string extending into the well.

BACKGROUND OF THE INVENTION

This invention directed generally to the field of oil well drilling and equipment therefor. More and more activity is being undertaken in the field of offshore drilling wherein stable platforms are used in shallow water but wherein floating platforms are desirable or a necessity for deep water drilling. Such floating platforms are inherently unstable and may comprise a barge or ship on which is mounted the rig or derrick. In the illustration shown here, the disclosure will be with respect to a ship-mounted derrick and the equipment therewith.

Since floating platforms and ships are inherently unstable, it is extremely difficult to mount the equipment and perform the operations in a manner which will most efficiently permit drilling from such vessel.

Particularly, for the purposes of this disclosure, the pipe and/or drill collar handling equipment must be devised so that the pipe or drill collars may be positioned quickly and accurately for placing in the well hole, or may be stacked or racked in such a manner that it cannot yield to the forces created by the roll or pitch of such vessel or to the force of wind or other forces which might normally be no problem in drilling from a stable platform.

In handling the pipe or drill collars, ordinarily the sections are coupled into what is termed "stands" made up of several sections for handling purposes. It is customary to work a stand of three sections of pipe or drill collars, which stand must be from time to time racked in position away from the center of the derrick so as to be out of the way of the drilling operations, but readily available to be picked up and moved to a position for connection to the drill string.

Heretofore, various methods have been devised for placing the pipe or drill collars over the well opening or for racking the stands, but the previous methods have been unsuitable or not the most efficient for use on an unstable platform such as a drilling vessel. Such previous methods have, in some instances, consisted of laying the stand down in horizontal fashion for racking However, some attempts have been made to rack the stands of pipe or drill collars vertically, especially where the drilling platform is stable. Reference is made to Moore, U.S. Pat. No. 2,507,040; Stone, U.S. Pat. No. 2,619,234 and No. 2,628,725 and to Corn, U.S. Pat. No. 2,703,178 as showing some of the activity in providing equipment for vertical racking. There are other examples.

In addition to the problem of effective holding of pipe or drill collar stands in the rack therefor, particularly in the case of an unstable platform or floating vessel, it is also a problem to effectively engage and support such stands of pipe or drill collars, as may be required in running and pulling a drill string, commonly called "round tripping," as the pipe or drill collar stands are moved between the rack and a position in alignment with the well bore, at which position the stand may be connected to or removed from the drill string.

Large inertia forces may be developed when a floating vessel pitches or rolls, and, therefore, apparatus for handling the pipe or collars during round tripping, as well as other movable apparatus, must be controlled at all times so as to be incapable of undesired movement. In this connection, the pipe and drill collar stands should not only be supported against undesired movement, but should also be supported in such a manner as to avoid damage to the pipe or collars, such as notching of the surface.

SUMMARY OF THE INVENTION

Accordingly, the present invention provides pipe racking apparatus which is particularly well suited for use on an unstable platform, such as a floating vessel, but which will be understood to also have application in any well drilling operation in which the control of the pipe handling equipment is to be automated or partly automated.

The present invention more particularly involves, and has an object, the provision of pipe or drill collar stand handling apparatus adapted to move such stands between a vertically racked position and a position vertically extended in alignment with the well, so that stands may be either removed from the well drilling string and moved into the rack therefor or removed from the rack and positioned above the drill string for connection to the latter, the stands being at all times securely confined against undesired movement and, during movement between the aforementioned positions, being supported by the usual shoulder provided on the usual drill pipe tool joints and drill collars.

In accomplishing the foregoing, the invention provides a pipe or drill collar engaging and guiding head adapted to hold the pipe or collar against swinging movements while allowing longitudinal movement of the pipe or collar, the invention providing also another pipe or drill collar engaging and supporting head adapted to support the stand by engagement beneath either the tool joint of a drill pipe stand or the shoulder of a drill collar, without requiring modification of the supporting head to accommodate the differences in diameters of the drill pipe and drill collars.

In addition, the invention provides support structure for the abovementioned heads, wherein longitudinally extended arms are shiftable in a horizontal plane both longitudinally and lateraly to enable corresponding movement of the pipe or collar stands between a first position over the well bore, a second selective position to one side of the well bore, and a third position within the rack apparatus.

More specifically, the pipe or collar guiding head and the supporting head are selectively operable to move a drill pipe tool joint supporting slide having a pipe receiving throat to a retracted position so that larger diameter pipe or drill collars may be received within a larger throat provided by the heads, the heads further having hooks pivotally carried thereby and shiftable between an open position, with the throat of the head open, to a closed position for confining the pipe or collar within the throat. The pipe supporting head has a portion of its slide adapted to engage beneath a tool joint of a drill pipe, and this head also has another portion adapted for engagement beneath a larger drill collar shoulder, when the slide is retracted, so that in either case, the hook may close to hold the stand in a position at which the weight of the stand is supported by one or the other portions of the slide or head engaging the tool joint or the drill collar shoulder, without requiring gripping engagement of an elevator or the like either with the threaded end of the stand or with the body of the pipe or collar.

Other objects and advantages of the invention will be hereinafter described or will become apparent to those skilled in the art, and the novel features of the invention will be defined in the appended claims.

BRIEF DESCRIPTION OF THE DRAWINGS

FIG. 4 is an enlarged fragmentary view in horizontal section, as taken on the line 4—4 of FIG. 2;

FIG. 5 is a view in vertical section, as taken on the line 5—5 of FIG. 4;

FIG. 7 is a view as taken on the line 7—7 of FIG. 6, and showing the intermediate racker head in top plan;

FIG. 8 is an elevational veiw as taken on the line 8—8 of FIG. 6;

FIG. 9 is a view in vertical section, as taken on the line 9—9 of FIG. 6;

FIG. 10 is a view in horizontal section, as taken on the line 10—10 of FIG. 6;

FIG. 12 is an enlarged fragmentary view in vertical section, as taken on the line 12—12 of FIG. 7 showing in broken lines a drill pipe tool joint supported in the head;

FIG. 16 is a view in vertical section, as taken on the line 16—16 of FIG. 12; and FIG. 17 is a view in vertical section, as taken on the line 17—17 of FIG. 12.

DESCRIPTION OF THE PREFERRED EMBODIMENTS

Figure 1:
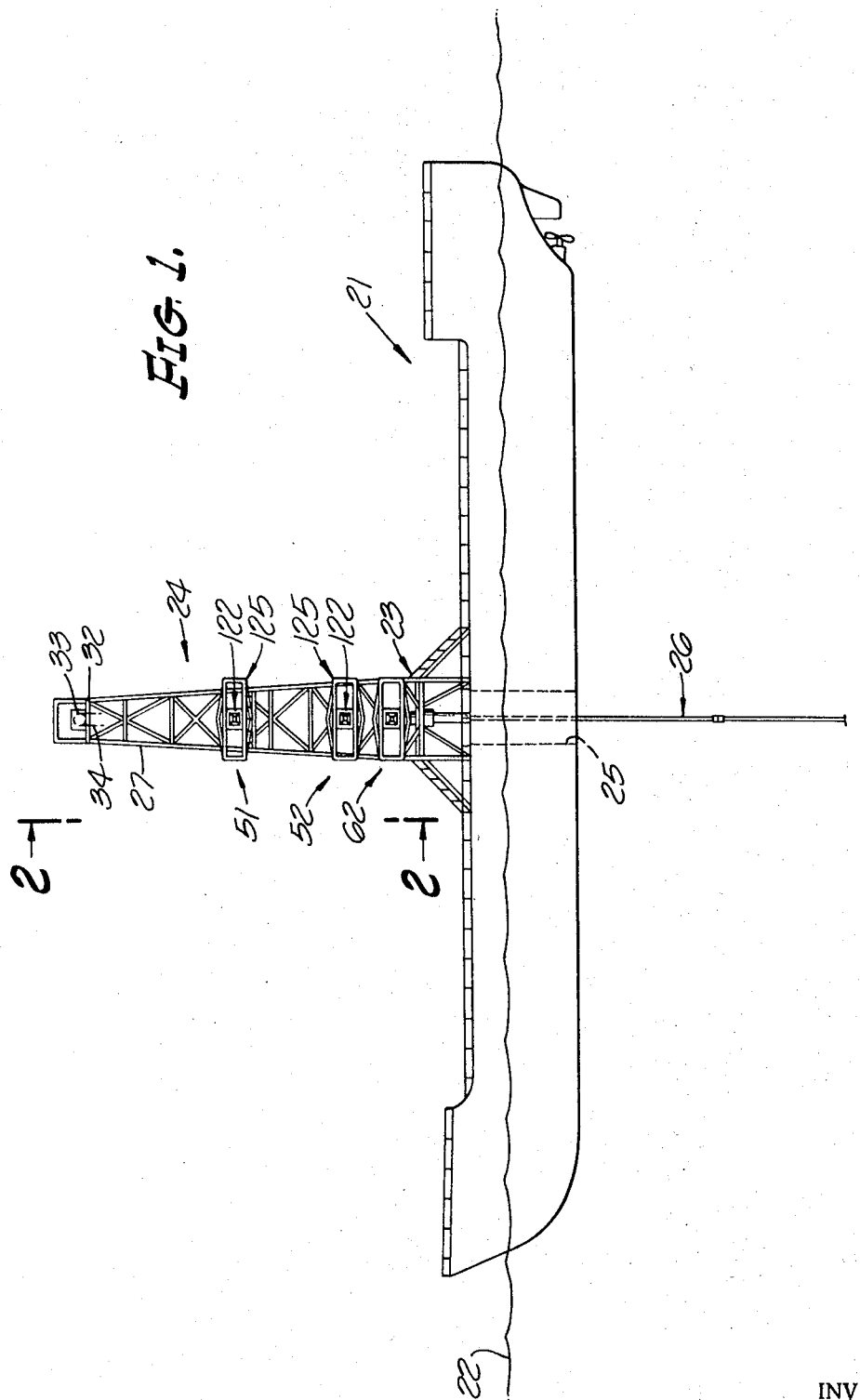
FIG. 1 is a side elevational view of a drilling ship having a derrick assembly, and including apparatus exemplary of the present invention.
Figure 2:
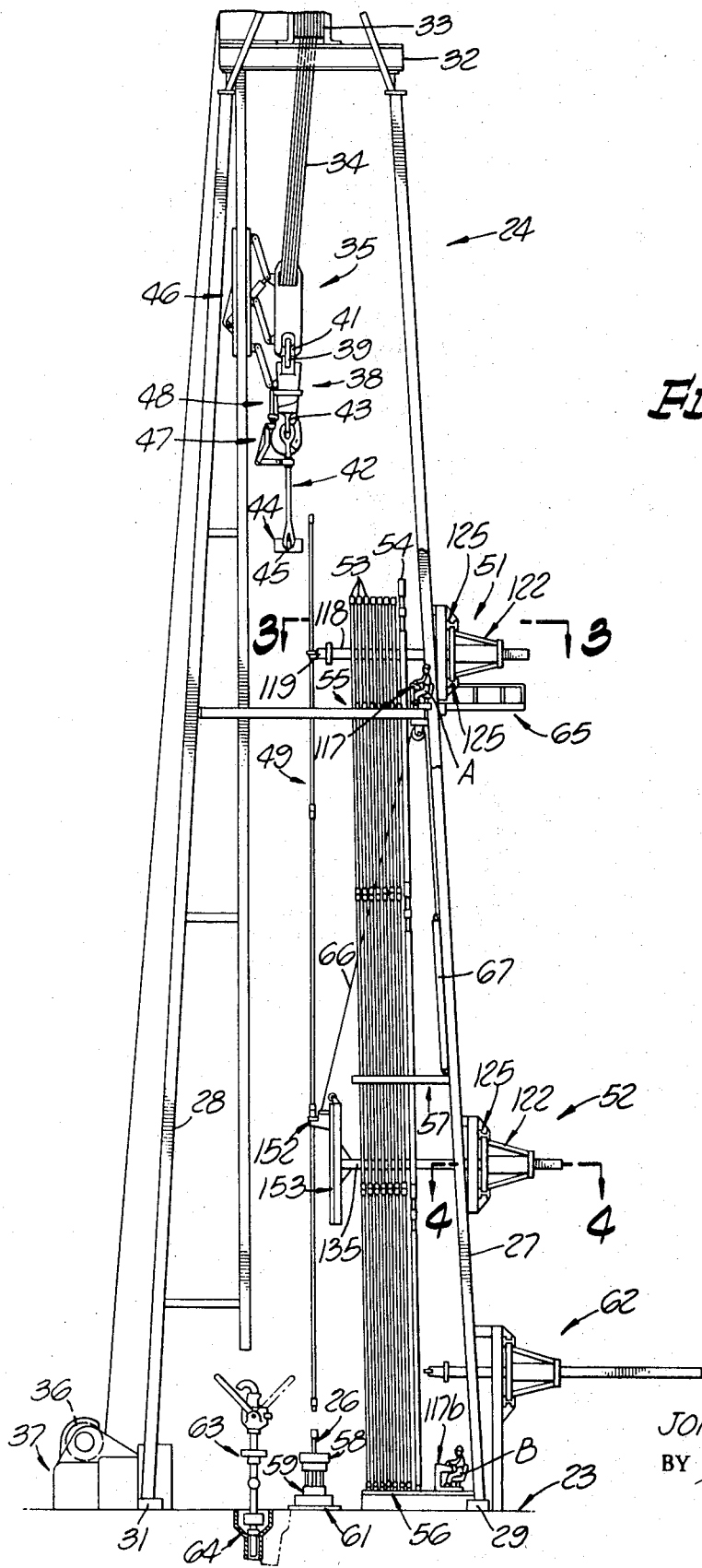
FIG. 2 is an enlarged side elevational view of the derrick assembly, taken on the line 2—2 of FIG. 1.

Referring to FIGS. 1 and 2, there is shown a drilling ship 21 afloat in the water, the surface of the water being designated 22. The ship has an elevated platform 23 positioned amidships. Erected on the platform is a drilling derrick 24. The ship has a moon hole 25 through which a drill string 26 extends from above the platform 23 into the water and thence into the earth (not shown) below. As this type of drilling ship with a platform and derrick is widely known in the field to which the invention pertains, it need not be described here in further detail.

The derrick 24 is shown somewhat schematically, sway braces, guy wires and similar structural members being omitted to enable working apparatus to be shown more clearly. The derrick has generally vertical corner posts 27 and 28 supported on the platform 23 on base members 29 and 31. A water table 32 near the top of the derrick carries the usual crown block 33 which is aligned with the vertical center line of the derrick. Suspended from the crown block by cable 34 is a traveling block 35. As is usual, one end (not shown) of the cable 34 is anchored to the ship's structure, and the other end is led to the spool 36 of a draw works 37 for raising and lowering the traveling block and the load supported thereby.

A hook structure 38 is swingably suspended from the bottom of the traveling block 35 by inter-engaged bails 39 on the hook and 41 on the block. An elevator link 42 is swingably suspended from an ear 43 on the hook structure, and the link has an elevator 44 swingably attached by another ear 45 to the lower end of the link 42. A second elevator link (not seen in FIG. 2) on the other side of the hook structure 38 similarly connects the elevator 44 to the hook structure 38.

The general reference numeral 46 denotes apparatus for positioning and guiding the block and hook structure. An elevator link stabilizing device is designated by the general reference numeral 47. The general reference numeral 48 designates apparatus for supplying compressed air to the elevator 44 to actuate it. The details of the herein illustrated hook stabilizing and positioning means 46, the link stabilizing means, and the means 48 for supplying air to the elevator 44 are more particularly disclosed in pending patent applications as follows:

Jones and Turner, Jr.—Block and Hook Structure Positioning and Guiding Appaartus, U.S. Ser. No. 687,819, filed Dec. 4, 1967, now Pat. No. 3,507,405;

Langowski and Turner, Jr.—Link Stabilizer for Well Drilling Rigs, U.S. Ser. No. 687,817, filed Dec. 4, 1967, now Pat. No. 3,526,425;

McFadden—Fluid Conductor Means for Hook Mounted Elevator, U.S. Ser. No. 687,829, filed Dec. 4, 1967, now Pat. No. 3,479,062;

Turner, Jr.—Stabilized Pipe Supporting Structure for Drilling Rigs, U.S. Ser. No. 687,818, filed Dec. 4, 1967, now Pat. No. 3,498,586.

A stand 49 of drill pipe is shown as being supported by pipe-handling equipment including an upper racker assembly 51 and an intermediate pipe supporting racker assembly 52, which will be hereinafter described. Other stands 53 of drill pipe or drill collars 54 are shown at rest in a pipe rack having a finger board 55, a base 56, and an intermediate rack member 57. The upper end of the string of drill pipe 26 is shown projecting above a set of power tongs 58, slips 59, and rotary table 61. Casing manipulating apparatus is shown at 62. A swivel and kelly assembly 63 is disposed in a rat hole 64.

Projecting outwardly from the derrick and positioned under the racker 51 is a horizontal stage 65 upon which an operator may stand to adjust or repair the racker.

Associated with the racker 52 is a cable 66 actuated by a fluid-powered piston-and-cylinder motor 67 for raising and lowering the racker head, as will be hereinafter described in detail.

Figure 3:
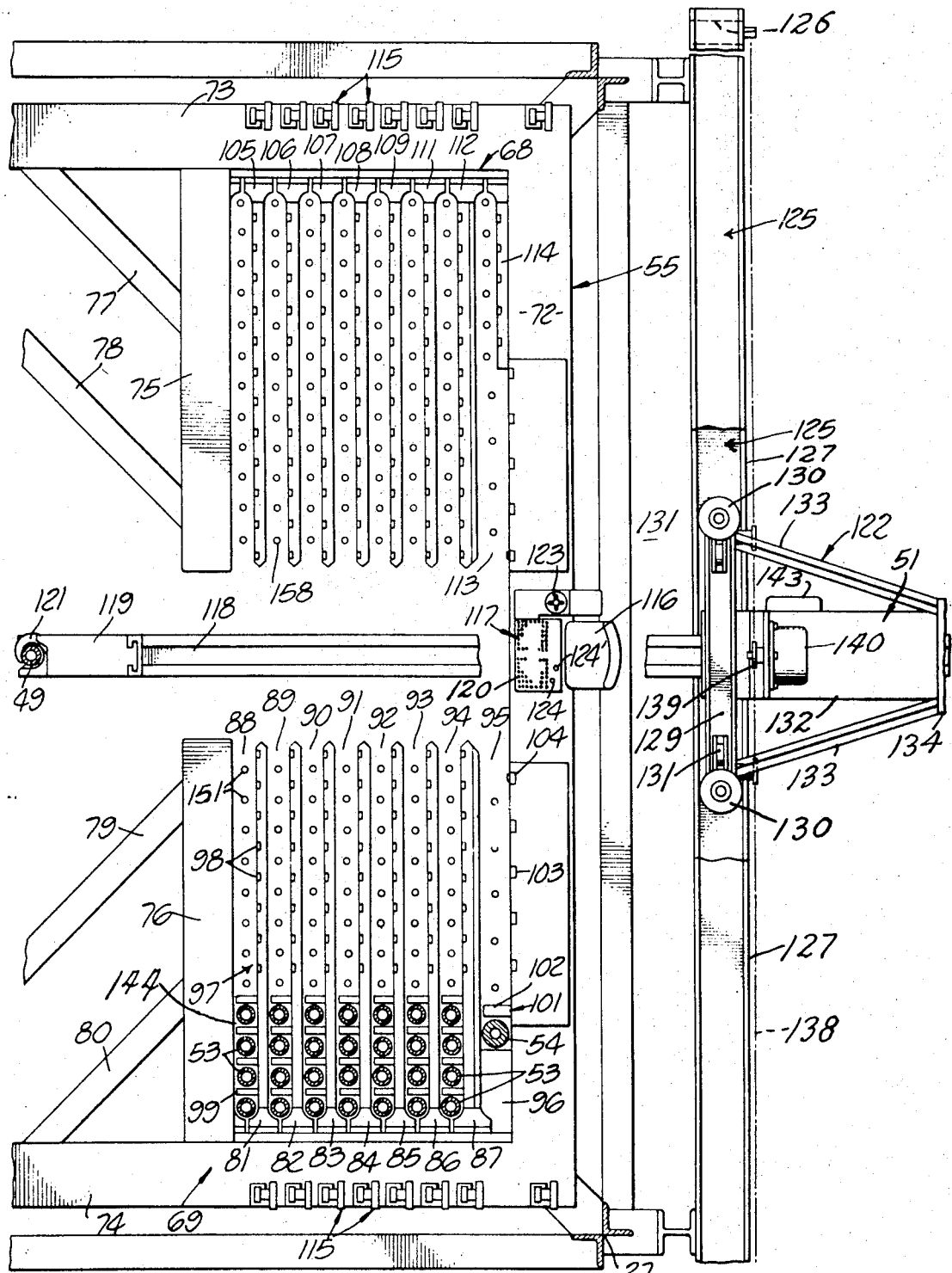
FIG. 3 is an enlarged fragmentary view showing in plan certain of the racking apparatus, and taken on the line 3—3 of FIG. 2.

Referring next primarily to FIG. 3, the finger board assembly 55 is shown as being in two sections; one, 68, located on the right-hand side and the other, 69, located on the left-hand side of an operator or derrick man A seated in a chair 116. It is noted that this finger board assembly 55 may be positioned at a considerable height in the derrick 24, for example, approximately 90 feet above the platform 23.

The finger board assembly 55 has the side rail 72 extending across the derrick man's side of the combined finger board assembly 55. Extending across the outer or closed side of the right-hand finger board section 68 is what may be termed an end rail 73, and extending across the left-hand outer end of the finger board section 69 is what may be termed another end rail 74. Extending inwardly from the end rails 73 and 74 are the front rails 75 and 76, respectively. The rails 72, 73, 74, 75 and 76 comprise the framework for supporting the finger board sections, and may be referred to as a walk-around. The front rails 75 and 76 have braces 77, 78 and 79, 80, respectively.

Mounted on the end rail 74 are drill pipe fingers 81, 82, 83, 84, 85 and 86, and one or more drill collar fingers 87. These fingers are mounted on their left-hand ends to extend horizontally toward a median vertical plane of the derrick 24 and are spaced apart laterally from the front rail 76 to the drill pipe finger 81, for example, a distance sufficient to accommodate the size of drill pipe to be racked therein. The finger 87 is spaced from the side rail 72 a distance to accommodate the diameter of the drill collar to be racked therein. The space between the front rail 76 and the finger 81 is here shown at 88. This space extends from the outer end of the finger to the base of the finger near the rail 74 and has sufficient horizontal depth to accommodate a selected number of stands of pipe 53, in the illustration here shown as twelve. The same holds true with respect to the spaces 89, 90, 91, 92, 93 and 94. The space 95 between the drill collar finger 87 and the side rail 72 is greater than that between the other fingers, but the depth of the space 95 is shown as being such that it will accommodate six stands of drill collars 54. The left-hand end of the space is shown as being closed by a gusset 96 which is preferably attached between the side rail 72 and the drill collar finger 87 and extends horizontally inward a distance to provide a support and reinforcement for the assembly and a stop for the first drill collar stand 54 racked therein.

Each of the fingers 81 through 87 has a series of spaced latches 97 spaced apart a sufficient distance to provide a quadrilateral opening 144 which will accommodate the diameter of a drill pipe, and extending from end to end of the fingers, there being shown in the illustration twelve such latches for each finger. The latches are indicated in their opened or raised position at 98, for example, and in the closed position at 99. In the opened position, pipe may be moved freely into and out of the openings between the fingers.

Similarly, the side rail 72 has a number of drill collar latches 101 extending for the length of the opening 95 at spaced intervals. The drill collar latches are indicated closed at 102 and opened at 103 for a purpose similar to the opened and closed latches of the racking fingers above described. At the inner end of the opening 95, the drill collar latch, here designated 104, is shown as reinforced.

The right-hand racking board section 73 is provided with drill pipe fingers 105, 106, 107, 108, 109 and 111, to accommodate drill pipe, and with a drill collar finger 112. In general, these fingers are identical with the fingers 81 through 87 above described; and function the same way. The space here shown as space 113, between the drill collar finger 112 and the side rail 72, has, in the right-hand end thereof, what may be termed a stub finger 114 which reduces the width of the space between the drill collar finger 112 and the side rail 72 for the purpose of the racking of drill pipe between the stub rail 114 and the drill collar finger 112. However, between the end of the stub finger 114 and the open end of the space 113, provision is made for the racking of drill collars, here shown as spaces (sometimes referred to as "compartments") for drill collars. The stub finger 114 has the same latch arrangement as the other fingers, and the drill collar latches are provided in connection with the side rail 72 the same as was the situation with respect to the left-hand racker section 69.

These various latches are not germane to the present invention, and their structure and mode of operation may be ascertained in detail by reference to the application of Johnson and Turner, Jr., Finger Board and Racker Apparatus, U.S. Ser. No. 687,820, filed Dec. 4, 1967, now Pat. No. 3,501,017. However, these latches may be hydraulically operated. Therefore, in FIG. 3, there are shown on each end rail 73 and 74, manifolds 115, there being in the illustration shown one manifold for each racking finger. Each manifold contains suitable valve means and solenoids (not shown) for actuating the valves for each latch on the racking finger served thereby, together with hydraulic lines leading to the latch-actuating mechanism and electrical connections leading to a console switch under control of the derrick man A.

In this connection, the derrick man (FIG. 2) has his seat 116 and a console 117 preferably centered between the right and left-hand racking sections 68 and 69, and facing toward the center of the drilling derrick 24. This console has two banks of toggle switches 120 schematically illustrated thereon, a switch for each latch and a row of switches for each racking finger.

There is also illustrated in FIG. 3 a portion of the upper racker means 51, including a racker arm 118 having a racker head 119 with pipe-guiding means 121, herein referred to as a hook or claw 121. Illustrated as being held in the claw 121 is the drill pipe 49. The racker arm 118 is mounted in a carriage 122 and has means, as will hereinafter be apparent, for extending and retracting the arm longitudinally. In addition, the carriage 122 is mounted in a horizontal track means 125 extending horizontally along the side of the derrick, and has means, as will also hereinafter be apparent, under control of the derrick man for moving the carriage laterally in the track means from side to side of the derrick. Such racker arms and carriage means are actuated by hydraulic motors under control of a four-way valve, the control handle 123 being shown schematically on the right-hand side of the derrick man's console 117. This console 117 also has valve means indicated schematically at 124 and 124' for manipulating the racker head and claw for grasping and releasing the pipe 49. It is noted that the racker arm 118 normally will be at a height so that it may pass over the derrick man's station without interfering with his position.

Referring again briefly to FIG. 2, it is apparent that the intermediate racker assembly 52 is under control of a "floor man" B. A console 117b, but without the toggle switches to control the latches, is operated by the floor man B to operate the intermediate racker 52, which will now be described.

Referring again to FIGS. 1 and 2, it will be noted that the intermediate racker assembly 52, like the upper assembly 51, comprises a carriage 122 and a frame structure or horizontal tank means 125 which supports the carriage 122 for movement laterally with respect to the side of the derrick. The general details of the carriage and frame structures are shown in FIGS. 4 and 5. The frame 125 comprises vertical side members 126 and horizontal channel members 127 interconnected at their ends and suitably reinforced to form a rigid rectangular frame suitably affixed to the side of the derrick. The carriage 122 also includes rigid side members 128 and top and bottom members 129 interconnected at their ends and forming a rectangular carriage support disposed between the structural members 126 and 127 of the frame 125. Suitable roller means, including upper and lower rollers 130 on the carriage support are revolvable on vertical axes and are disposed in the frame channel members 127 to support the carriage against tilting; and other roller means, such as a number of rollers 131 revolvable on horizontal axes beneath the lower carriage support member 129, engage in the channel of the lower frame member 127 to support the vertical load of the carriage 122 while facilitating movement of the carriage from side to side in the frame 125.

A hollow guide 132 is centrally supported in the carriage support members 128 and 129 by suitable rigid braces 133 and an outer rectangular carriage support 134. Reciprocable in the guide 132 of the intermediate racker arm assembly 52 is a rigid elongated racker arm 135 adapted to move longitudinally in the guide 132. Preferably, suitable rollers are interposed between the sides of the arm 135 and the inside of the guide 132, as indicated at 136, and other rollers 137 are interposed between the top and bottom of the arm 135 and the guide 132 so as to facilitate longitudinal movement of the arm 135, notwithstanding the fact that the arm 135 may support a large weight at its end, namely, a stand of drill pipe or drill collar, as will hereinafter appear.

Means are provided for effecting lateral movement of the carriage 122 within the frame 125, and, illustratively, such means comprises a drive chain 138 extending across the frame 125 and connected at its ends to the frame side members 126, the chain engaging a drive sprocket 139 adapted to be driven by a reversible motor 140, the motor being suitably mounted on the guide 132. Means are also provided for effecting longitudinal movement of the arm 135, and, illustratively, such means comprises a chain 141 extending longitudinally beneath the arm and attached at its opposite ends to the arm. A sprocket 142 driven by a reversible motor 143 acts to move the chain 141 and thus the arm longitudinally of the guide 132. In a manner requiring no further illustration, it will be understood that both of the chain drive motors 140 and 143 may be conventional hydraulic motors adapted to be operated in reverse directions in response to manipulation of suitable valve means (not shown) under control of the floor man B at the console 117b. It will also be understood that the carriage 122 of the upper racker 51 and the arm 118 thereof may be caused to traverse the upper frame 125 and to be longitudinally shifted, in the same manner as just described.

At the inner end of the racker arm 135 of racker assembly 52 is a racker head 152 adapted for vertical movement in a head support 153 which is rigidly joined with the arm 135. The details of this head and head support structure are best seen in FIGS. 6 to 17.

Figure 6:
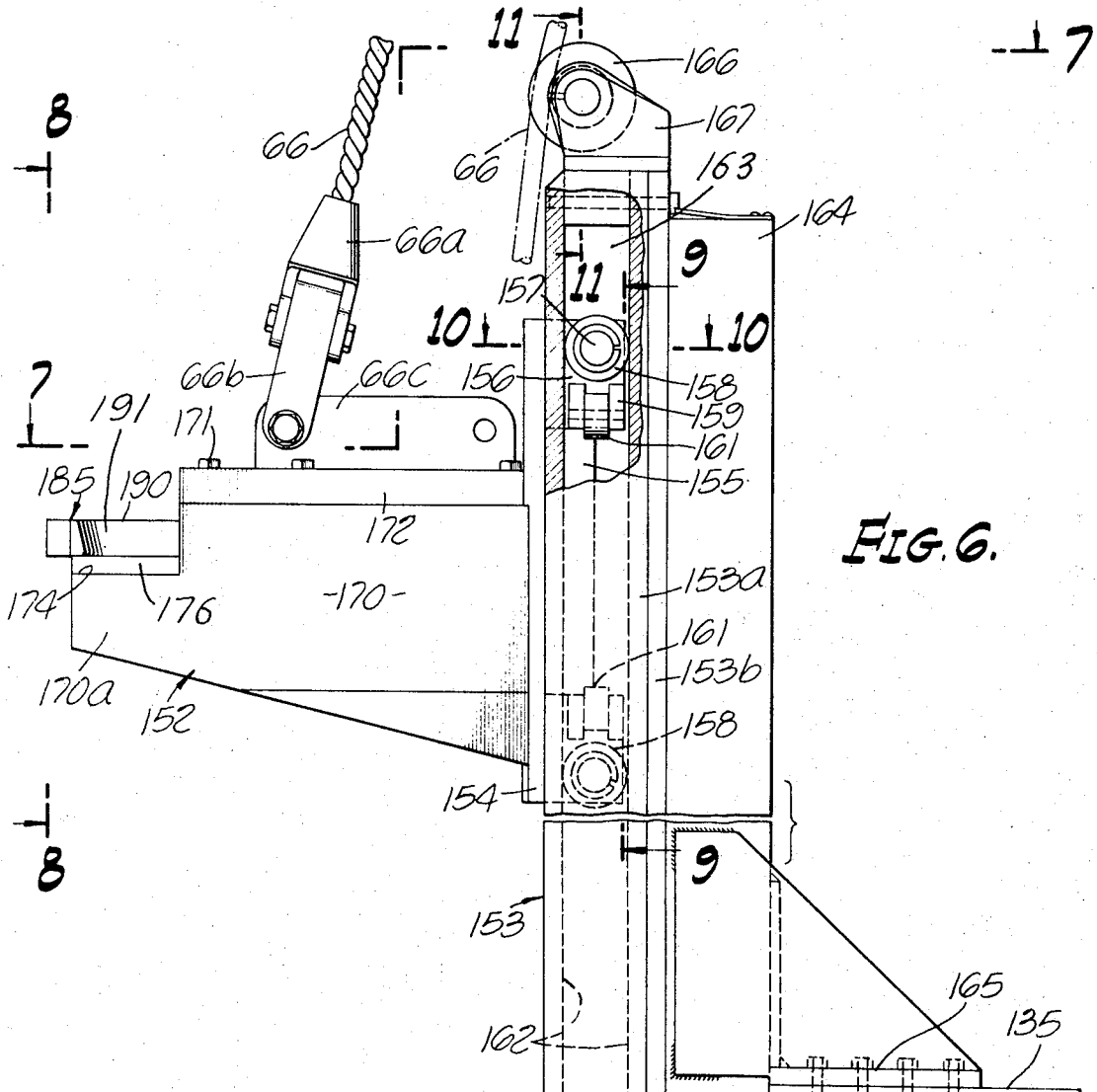
FIG. 6 is an enlarged fragmentary detail view showing the intermediate racker head and support, certain of the parts being broken away.
Figure 11:
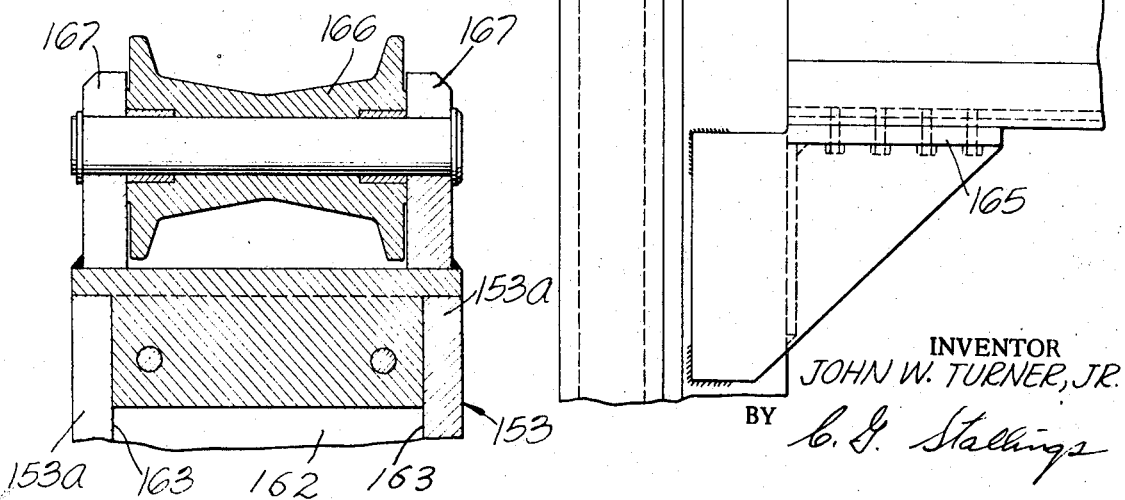
FIG. 11 is a view in vertical section, as taken on the line 11—11 of FIG. 6.

In this connection, the racker head 152 includes a support plate 154 extending vertically and having a central flange 155 projecting outwardly therefrom and made a part thereof as by welding. Adjacent its upper and lower ends, the plate 154 has bearing blocks 156, each adapted to support an axle 157 for a pair of rollers 158. Each block 156 also has ears 159 projecting therefrom for supporting axles 160 of rollers 161 at opposite sides of the block. These rollers 161 are revolvable on horizontal axes displaced 90° from the axes of the rollers 158, whereby to support the head 152 against cocking in any direction relative to the head support 153. This support 153 is a vertically elongated fabricated body having side members 153a providing channels defined by opposing walls 162 adapted to receive the rollers 158 therebetween and the members 153a cooperating to provide opposing side walls 163 adapted to receive the rollers 161 therebetween (see FIG. 10). These channel members 153a are welded or otherwise connected to a vertical plate 153b, which, in the illustrative embodiment, is welded or otherwise attached to a channel member 154, which is in turn connected to the inner end of the racker arm 135, as seen in FIG. 6, by means of reinforced brackets 165. In any event, the construction of the head support 153 and its connection to the arm 135 should be strong and rigid, since it must support substantial weight and hold the racker head 152 against undesired movement, even when the vessel 21 is subjected to heavy pitch and roll and the head 152 may be supporting a stand of pipe or drill collars, and as such stand is being elevated or lowered or moved laterally into the racking fingers previously described.

Such elevation and lowering of the racker head 152 is accomplished by the cable 66, previously described, which is suitably connected to the racker head, as seen in FIG. 6, for example. In this illustrative embodiment, the cable 66 is provided with a rope socket 66a connected by a clevis or other connector 66b to a web 66c provided on the head 152. In addition, if desired, a roller 166 may be journalled between ears 167 provided at the upper end of the head support 153, so as to engage the cable, as seen in broken lines in FIG. 6, when the head 152 is lowered.

Figure 13:
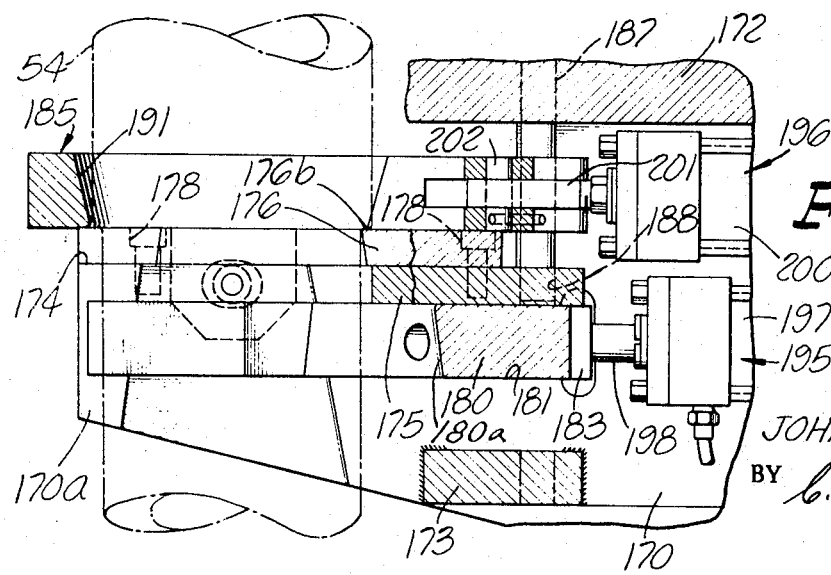
FIG. 13 is a fragmentary view corresponding to FIG. 12, but showing a drill collar supported in the head.

The racker head 152 comprises opposing side walls 170 connected as by screws 171 beneath a top wall 172 and braced by a crosspiece 173 for rigidity. At their ends facing into the derrick, the walls 170 of the head 152 are provided with extensions 170a of reduced height providing upper horizontal surfaces 174; and between the side walls 170 is a support plate 175, welded or otherwise affixed, and having its upper surface flush with the surfaces 174 of the wall extensions 170a. An adaptor plate 176 is disposed on the surfaces 174, being secured thereto by fasteners 177 and fasteners 178 (see FIGS. 7 and 12). This adaptor plate 176 has a throat or pipe opening 176a of a desired size, say to fit under the shoulder of a drill collar, as will hereinafter be more fully described, and the peripheral edge of the throat is provided with a surface or shoulder at 176b for this purpose, as best seen in FIG. 13. Below this surface 176b, the periphery of the plate defining the throat 176a flares outwardly so as to not interfere with the proper engagement of the surface 176b with the shoulder of the drill collar.

Figure 14:
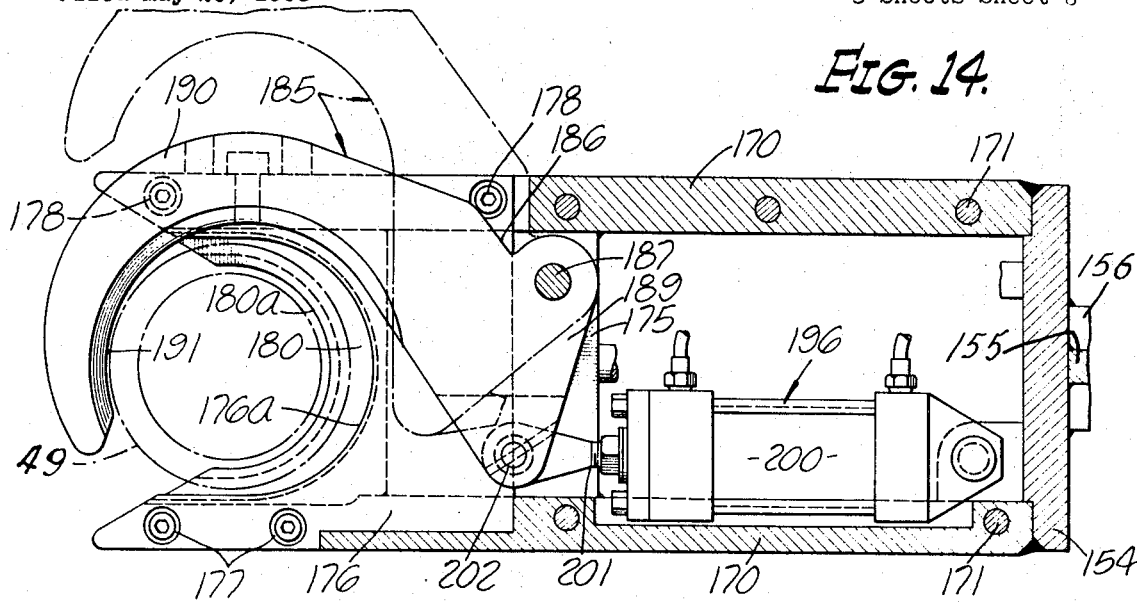
FIG. 14 is a view in horizontal section, as taken on the line 14—14 of FIG. 12.
Figure 15:
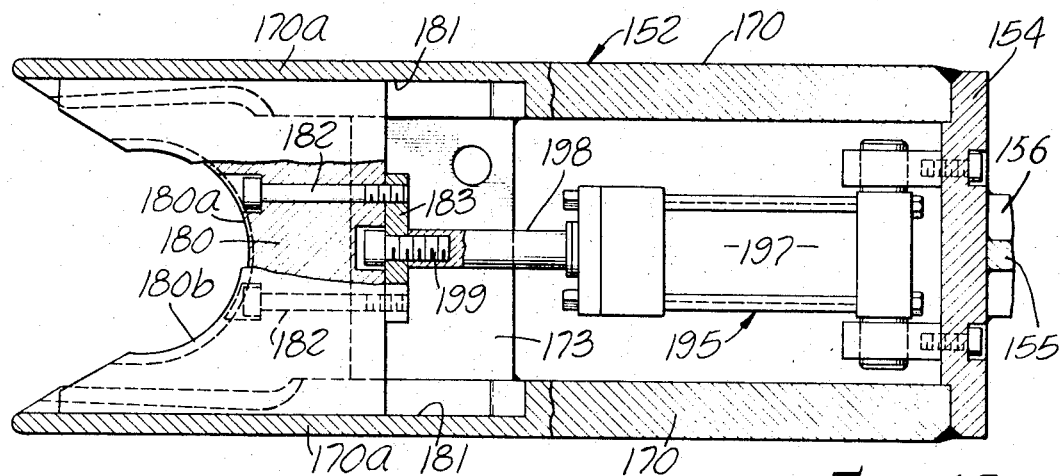
FIG. 15 is a view in horizontal section, as taken on the line 15—15 of FIG. 12.

In order that the head may be capable of also supporting pipe of a diameter smaller than that supportable on the surface 176b, slide means are provided, including a slide plate 180. This plate 180 is slidably disposed in opposed grooves 181 in the side walls 170 of the head, and is connected by fasteners 182 to a slide actuator head 183 (see FIG. 15) so as to be reciprocable in the grooves 181 as will later be described. Slide plates 180 of the desired size may be employed, say a slide plate 180 related to the adaptor plate 176, so that the head is adapted to support related drill pipe and drill collar sizes. In this connection, the slide plate 180, as best seen in FIGS. 7, 14 and 16, has a throat or pipe opening 180a adapted to receive a drill pipe of a smaller diameter than the throat 176a of the adaptor plate 176. Moreover, the plate 180 is provided with a surface 180b adapted, as shown in FIG. 12, to receive the body of the drill pipe and engage the taper or shoulder provided by the tool joint, when the slide plate 180 is in the projected position of FIGS. 7 and 12; but this slide plate 180 may be withdrawn so as to not engage a larger pipe adapted to be engaged by the adaptor plate 176.

Accordingly, it will be understood that different combinations of adaptor plates 176 and slide plates 180, having related throat diameters may be interchangeably employed in the head 152, whereby to enable the handling and racking of drill pipe and drill collars of a range of relative diameters.

Hook or claw means 185 are provided for engaging a drill pipe or drill collar above the support surfaces 176b and 180b, such means, as will be best understood upon reference to FIGS. 7, 8, 12–14 and 16, operates to urge the drill pipe or drill collars, as the case may be, into the throat 180a or 176a of the slide plate 180 or the adaptor plate 176, respectively. More particularly, the claw means 185 comprises a lever 186 pivotally connected to the body of the racker head 152 as by means of a pivot pin 187, this pin extending downwardly through the upper wall 172 of the racker head into an opening 188 provided in the previously described plate 175 which extends transversely between the side walls 170 of the racker head. The lever 186 includes an actuator arm 189 and a working arm 190, the latter extending generally arcuately in the nature of a hook or claw and having an inner arcuate surface 191 adapted, when the working arm 190 is in one position, to engage a drill pipe tool joint or a drill collar to apply a force thereto tending to urge the same into the appropriate throat 176a or 180a of the drill pipe supporting slide plate 176 and adaptor plate 180, respectively, while being movable to a second position, as shown in broken lines in FIG. 14, at which the just-mentioned throats are open for reception of the drill pipe or drill collar.

Actuator means 195 are provided for effecting the movement of the drill pipe supporting slide 180 between the outwardly projected position shown in FIG. 12 and the retracted position shown in FIG. 13, an actuator means 196 are provided for effecting movement of the hook or claw lever 186 between the full line and broken line positions of FIG. 14. The first-mentioned actuator means 195 may comprise a fluid pressure operated actuator cylinder 197 having a rod 198 projecting therefrom and suitably connected to the slide actuator head 183 by a suitable fastener means 199, so that extension of the rod 198 will effect projection of the drill pipe supporting slide 180 to the pipe supporting position of FIG. 12 and retraction of the rod 198 will effect movement of the drill pipe supporting slide 180 to the out-of-the-way position shown in FIG. 13. The actuator means 196 also may comprise a fluid pressure actuator cylinder 200 having an actuator rod 201 projecting therefrom and pivotally connected as at 202 to the actuator arm 189 of the claw lever 186. Thus, projection of the rod 201 will effect pivotal movement of the lever 186 to the broken line position of FIG. 14, and retraction of the rod 201 will effect movement of the lever 186 to the full line position of FIG. 14.

It will be understood that the control of the respective actuator means 195 and 196 may be effected by the previously described floor man B by the operation of suitable valve control means (not shown).

Without requiring further illustration, it will be apparent that the upper pipe racker head 119 on the racker arm 118 may be so constructed, including the provision of the previously described hook or claw 121 thereon, that said claw 121 may be opened or closed to confine an upper region of a stand of drill pipe, such as the stand 49 of FIGS. 2 and 3 or a stand of drill collars, such as the stand 54 of FIG. 2, against lateral movement relative to the head 119; but the stand may be elevated and lowered relative to the head 119. In addition, while the means 62 of FIGS. 1 and 2 has been previously described as casing handling apparatus, such means may include another head and claw means adapted to effect sliding engagement with the stand in certain pipe handling operations.

In the use of the apparatus as described above, the stand of drill pipe 49 illustrated in FIG. 2 in a position disposed above and in alignment with the drill string 26 supported in the slips 59 may be either made up in the pipe string 26 or moved into the rack therefor. In the latter case, the floor man B will effect operation of the motors 143 in a direction to effect retraction of the racker arm 135, and, correspondingly, such retraction of the racker arm 118 of the upper racker means 51. When the stand of pipe 49 is retracted to a location aligned with the desired space between any of the racker fingers 81 through 87 or 105 through 112, the floor man B will arrest retraction of the racker arms 118 and 135 and effect lateral movement of the carriages 122 relative to the frames 125 of the racker means 52 and 51 by causing operation of the chain drive motors 140 in the desired direction, arresting such lateral movement when the stand is at the desired location between the fingers so as to be latched in place upon movement of the latch means previously described to a pipe stand confining position. Thereafter, the racker head 152 may be lowered by the actuator cylinder 67 so as to allow the pipe stand to come to rest upon the racker base 56 which may, if desired, be provided with upstanding protuberances, designated 151 in FIG. 3, for engagement in the open lower end of the pipe stand for holding the same against displacement responsive to pitch or roll of the vessel. Following this, the floor man B may effect opening of the claws 121 and 185 so that the racker head may be moved in a reverse direction, that is, back to the center of the rack assembly and then back towards a position at which the next stand of pipe may be picked up. During the operation of racking a stand as just described, the pipe hoisting equipment, comprising the traveling block 35, the hook 38, the links 42 and the elevator 44, may be lowered so as to allow engagement of the next stand of pipe included within the drill string 26, so that the drill string may be elevated to a position for allowing removal therefrom of the next stand of pipe in response to operation of the power tong mechanism 58.

The operation of running the pipe stands will be understood without further description herein as being simply a reversal of the above described operation. When drill collar stands 54 are to be run into the well or racked, as the case may be, the operations moreover are substantially the same as those described above, except for the fact that the drill pipe supporting slide 180 will be retracted by the actuator means 195 so as to allow engagement of the adaptor plate 176 with the drill collars. The upper head 119, thus, will be understood without need of illustration to include a retractable plate such as the plate 180 and an adaptor plate such as the plate 176, so that the upper head is adapted to guide pipe and drill collars of different diameters, while snugly held by the claw 121. Since the upper head in the illustrative embodiment is merely a guide, it will also be understood that the just-mentioned slide and adaptor plates will have throats, such as the throats 180*a* and 176*a*, of slightly larger size so as to receive the major drill pipe and drill collar diameters.

From the foregoing, the mode of operation of the present invention will be fully apparent and needs no further description, and while the specific details of an illustrative embodiment of the invention have been shown and described, changes and alterations may be made without departing from the spirit of the invention as defined in the appended claims.

What is claimed is:

1. A racker head for engaging stands of well drill pipe and drill collars providing supporting shoulders of different diameters comprising: stand supporting means selectively releasably engageable with said shoulders of different diameters for supporting said stands in said head, wherein said stand supporting means comprises a first plate having a lateral opening for receiving a stand of one diameter and a supporting surface defining said opening and engageable with a shoulder on one of said stands, a second plate having a lateral opening for receiving another stand of another diameter and a supporting surface defining said opening in said second plate and engageable with a shoulder on said another of said stands, said plates being disposed one above the other, with said lateral openings aligned, and including means for moving the plate with the smaller opening to a position out of alignment with the opening of the other plate and allowing entry of a larger stand into the opening of said other plate.

2. A racker head as defined in claim 1, wherein said stand supporting means includes a claw pivotally carried by said head and means for moving said claw between a first position bridging said lateral openings and a second position spaced from said openings.

3. A racker head for engaging stands of well drill pipe and drill collars providing supporting shoulders of different diameters comprising: stand supporting means selectively releasably engageable with said shoulders of different diameters for supporting said stands in said head, wherein said stand supporting means comprises a first plate having a lateral opening for receiving a stand of one diameter and a supporting surface defining said opening and engageable with a shoulder on one of said stands, a second plate having a lateral opening for receiving another stand of another diameter and a supporting surface defining said opening in said second plate and engageable with a shoulder on said another of said stands, said plates being disposed one above the other, with said lateral openings aligned, and including means for moving the plate with the smaller opening to a position out of alignment with the opening of the other plate and allowing entry of a larger stand into the opening of said other plate, and including means for removably supporting said other plate in said head.

4. A racker head for engaging stands of well drill pipe and drill collars providing supporting shoulders of different diameters comprising: a body having parallel side walls providing spaced apart extensions, an adaptor plate affixed to said extensions and having a pipe receiving throat opening between said extensions and a shoulder engaging surface defining said throat, a slide plate shiftably carried by said extensions for longitudinal sliding movement between a projected position beneath the pipe receiving throat of said adaptor plate to a retracted position out of alignment with the throat of said adaptor plate, said slide plate having a pipe receiving throat opening between said extensions and a shoulder engaging surface defining said throat, said throat of said slide plate being smaller than said throat of said adaptor plate, and means for moving said slide plate between said positions.

5. A racker head as defined in claim 4, wherein means are provided for releasably supporting said adaptor plate on said extensions, whereby adaptor plates having different throat sizes are interchangeably connectable to said extensions.

6. A racker head as defined in claim 4, wherein means are provided for removably connecting said slide plate to said means for moving said slide plate, whereby slide plates having different throat sizes are interchangeably connectable to said means for moving said slide plate.

7. A racker head as defined in claim 4, including an arcuate claw pivotally mounted above said adaptor plate and movable between a first position bridging said openings and a second position spaced from said openings, and including means for moving said claw between said positions.

References Cited

UNITED STATES PATENTS

| | | | |
|---|---|---|---|
| 1,801,976 | 4/1931 | Penny | 294—91 |
| 2,596,828 | 5/1952 | Stone | 214—2.5 |
| 2,652,160 | 9/1953 | LaMulle | 214—2.5 |
| 3,365,081 | 1/1968 | McLerran | 214—2.5 |
| 3,458,230 | 7/1969 | Jones et al. | 294—90 |

GERALD M. FORLENZA, Primary Examiner

F. E. WERNER, Assistant Examiner

U.S. Cl. X.R.

214—2.5; 294—104